United States Patent
Choi

(10) Patent No.: US 9,168,967 B2
(45) Date of Patent: Oct. 27, 2015

(54) FRAME UNIT FOR BICYCLE AND METHOD OF MANUFACTURING THE SAME

(71) Applicant: Hyundai Motor Company, Seoul (KR)

(72) Inventor: Jungnam Choi, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 5 days.

(21) Appl. No.: 14/144,381

(22) Filed: Dec. 30, 2013

(65) Prior Publication Data

US 2015/0048592 A1 Feb. 19, 2015

(30) Foreign Application Priority Data

Aug. 16, 2013 (KR) .................. 10-2013-0097427

(51) Int. Cl.
| | | |
|---|---|---|
| *B62K 19/00* | (2006.01) | |
| *B62K 19/08* | (2006.01) | |
| *B21D 53/86* | (2006.01) | |

(52) U.S. Cl.
CPC ............... *B62K 19/08* (2013.01); *B21D 53/86* (2013.01)

(58) Field of Classification Search
CPC ........ B62K 19/00; B62K 19/12; B62K 19/02; B62K 19/08; B62K 15/00
USPC ...................................... 280/288.3, 278, 287
See application file for complete search history.

(56) References Cited

U.S. PATENT DOCUMENTS

| | | | | |
|---|---|---|---|---|
| 1,394,866 | A * | 10/1921 | Schoenknecht | 280/287 |
| 2,089,889 | A * | 8/1937 | Giordani | 280/288.3 |
| 4,550,927 | A * | 11/1985 | Resele | 280/281.1 |
| 4,613,146 | A * | 9/1986 | Sharp et al. | 280/288.2 |
| 4,746,136 | A * | 5/1988 | Kirk | 280/281.1 |
| 5,011,172 | A * | 4/1991 | Bellanca et al. | 280/281.1 |
| 5,456,481 | A * | 10/1995 | Allsop et al. | 280/281.1 |
| 5,464,240 | A * | 11/1995 | Robinson et al. | 280/281.1 |
| 5,769,442 | A * | 6/1998 | Robinson et al. | 280/281.1 |
| 5,791,673 | A * | 8/1998 | Patterson | 280/281.1 |
| 6,017,048 | A * | 1/2000 | Fritschen | 280/281.1 |
| 6,612,600 | B2 * | 9/2003 | Devitt et al. | 280/288.3 |
| 6,971,658 | B2 * | 12/2005 | Chao | 280/278 |
| 7,188,852 | B1 * | 3/2007 | Fritschen | 280/281.1 |
| 7,971,892 | B2 * | 7/2011 | Sasnowski et al. | 280/288.3 |
| 2012/0013101 | A1 * | 1/2012 | Huang et al. | 280/287 |

FOREIGN PATENT DOCUMENTS

KR 10-2012-0019777 A 3/2012

* cited by examiner

*Primary Examiner* — Joseph Rocca
*Assistant Examiner* — Michael Stabley
(74) *Attorney, Agent, or Firm* — Morgan, Lewis & Bockius LLP

(57) ABSTRACT

A frame unit for a bicycle may include a left frame body in which a part of an adjusting portion, a part of a seat tube, a part of a frame, and a left stay are integrally formed; and a right frame body in which a part of the adjusting portion, a part of the seat tube, a part of the frame, and a right stay are integrally formed, in which the seat tube and the frame are integrally formed by adjusting a length of the adjusting portion, and the left frame body and the right frame body are coupled integrally.

15 Claims, 7 Drawing Sheets

FRAME UNIT FOR BICYCLE AND METHOD OF MANUFACTURING THE SAME

CROSS-REFERENCE TO RELATED APPLICATION

The present application claims priority to Korean Patent Application No. 10-2013-0097427 filed on Aug. 16, 2013, the entire contents of which is incorporated herein for all purposes by this reference.

BACKGROUND OF THE INVENTION

1. Field of the Invention

The present invention relates to a frame unit for a bicycle and a method of manufacturing the same, and more particularly, to a frame unit for a bicycle which includes a head tube, a seat tube, a frame, and left and right stays and a method of manufacturing the same.

2. Description of Related Art

In general, a frame unit for a bicycle is a constituent component that forms an overall structure of a bicycle, and manufactured by mutually joining constituent components such as a head tube, a seat tube, a frame, and left and right stays.

Regarding the frame unit for a bicycle, securement of differentiation in design and rigidity for safety are core factors, and to this end, the respective manufacturers actively conduct researches on development of technologies, process methods, materials, and the like.

Recently, in order to secure differentiation in design and rigidity for safety, materials such as aluminum, chromium-molybdenum steel, carbon, and titanium are used instead of a high tensile steel material that is generally used.

FIG. 1 is a configuration diagram of a frame unit for a bicycle according to the related art.

Referring to FIG. 1, a frame unit 100 for a bicycle of the related art includes a head tube 101, a seat tube 103, an upper frame 105, a lower frame 107, and upper and lower stays 109 and 111 disposed at both sides.

A steering shaft to which a steering handle is connected is installed on the head tube 101, and a seat pipe connected to a seat is installed on the seat tube 103.

The upper and lower frames 105 and 107 connect and support the head tube 101 and the seat tube 103 at front and rear sides thereof.

Rear ends of both the upper and lower stays 109 and 111 are connected to each other so as to form a rotating body fork 113 to which a rear wheel is mounted.

A front end of the lower stay 111 is connected to a pedal assembly 115 that is configured at a lower end of the seat tube 103.

Meanwhile, the frame unit 100 for a bicycle mostly includes both the upper frame 105 and the lower frame 107, but in some cases, only a single frame, that is, only the upper frame 105 may be applied between the head tube 101 and the seat tube 103.

However, according to the frame unit 100 for a bicycle of the related art, which has the aforementioned configuration, when the head tube 101 is joined to the upper frame 105 or front ends of the upper and lower frames 105 and 107 by a welding process, residual stress due to welding heat is distributed to joining portions, and particularly, impact loads are directly applied when the bicycle runs, thereby causing a serious problem with respect to safety such as cracks or damage occurring at the periphery of the joining portions.

In addition, since the process of welding the joining portions is manually performed, an inferiority rate is high because there is a difference in welding quality in accordance with skill of workers and working environment, and thereby, there are drawbacks in that an excessive working time is required and productivity deteriorates.

In addition, because the frame unit 100 for a bicycle of the related art is manufactured to have various sizes for each specification, a mold corresponding to each size lineup for each specification needs to be separately manufactured, and thereby, there are drawbacks in that manufacturing costs are increased and productivity deteriorates.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a frame unit for a bicycle including, a left frame body in which a part of an adjusting portion, a part of a seat tube, a part of a frame, and a left stay are integrally formed, and a right frame body in which a part of the adjusting portion, a part of the seat tube, a part of the frame, and a right stay are integrally formed, in which the seat tube and the frame are integrally formed by adjusting a length of the adjusting portion, and the left frame body and the right frame body are coupled integrally.

Before the left frame body and the right frame body are coupled, the length of the adjusting portion may be adjusted, and a head tube may be formed by bending the adjusting portion.

A support ring may be inserted into the head tube.

The left and right frame bodies may be joined to each other along edges of the left and right frame bodies in a state in which a plurality of reinforcing panels is installed inside the left and right frame bodies.

The reinforcing panels may be installed between the head tube and the frame, between the seat tube and the frame, on a portion of the left and right stays where a rear wheel is installed, and inside a pedal assembly on which a pedal is installed, respectively.

The reinforcing panels may be joined together when the left and right frame bodies are joined in a state in which the reinforcing panels are fitted or temporarily joined to the left and right frame bodies.

On the reinforcing panel, a plurality of reinforcing beads may be formed.

The reinforcing beads may protrude so as to intersect inward and outward from the reinforcing panel.

A seat pipe may be coupled to the seat tube, and a length of the seat pipe may be determined in accordance with a predetermined position of the head tube.

Before the left frame body and the right frame body are coupled, the length of the adjusting portion may be adjusted, and the head tube may be coupled to the adjusting portion.

The seat pipe may be coupled to the seat tube, and a length of the seat pipe may be determined in accordance with a predetermined position of the head tube.

Another exemplary embodiment of the present invention provides a method of manufacturing a frame unit for a bicycle including, press-forming a left frame body in which a part of an adjusting portion, a part of a seat tube, a part of a frame, and a left stay are integrally formed, press-forming a right frame body in which a part of the adjusting portion, a part of the seat tube, a part of the frame, and a right stay are integrally formed,. adjusting a length of the adjusting portion, and. coupling the left frame body and the right frame body.

After adjusting the length of the adjusting portion, a head tube may be formed by bending the adjusting portion, and the left frame body and the right frame body may be coupled.

A support ring may be inserted into and coupled to the head tube.

The press-forming may further form a plurality of reinforcing beads on the adjusting portion.

Reinforcing panels may be installed inside the left and right frame bodies, and the reinforcing panels may be joined to each other together with the left and right frame bodies along edges thereof.

The reinforcing panels may be installed between the head tube and the frame, between the seat tube and the frame, on a portion of both the stays where a rear wheel is installed, and inside a pedal assembly on which a pedal is installed, and thereafter, joined together with the left and right frame bodies.

The reinforcing panels may be joined together with the left and right frame bodies in a state in which the reinforcing panels are fitted or temporarily joined to the left and right frame bodies.

The reinforcing panels may be formed together with reinforcing beads that protrude so as to intersect each other inward and outward.

After adjusting the length of the adjusting portion, the left frame body and the right frame body may be coupled, and the head tube may be coupled to the adjusting portion.

According to the exemplary embodiment of the present invention, by adjusting a length of the adjusting portion, the bicycles may be easily produced so as to correspond to a size for each specification, and thereby, a process of newly manufacturing a mold, which is manufactured for each specification, may be removed.

In addition, the frame unit for a bicycle is produced using a single mold, thereby improving productivity and reducing manufacturing costs.

In addition, the left and right frame bodies, which form the frame and the left and right stays, respectively, are integrally press-formed and coupled, thereby facilitating a manufacturing process.

Particularly, rigidity and durability between the head tube and the frame with respect to an impact load transmitted from a road surface and a fatigue load of the frame unit per se are firmly maintained, thereby preventing damage such as cracks, and securing safety.

In addition, the seat tube, the frame, and the left and right stays, which form the left and right frame bodies, are integrally formed, thereby making the entire outer appearance of the frame unit for a bicycle be aesthetically attractive.

In addition, welding work is performed along edges of the left and right frame bodies when the left and right frame bodies are joined, such that welding processes may be easily automated, working times may be reduced due to the automation, and welding quality and productivity may be improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
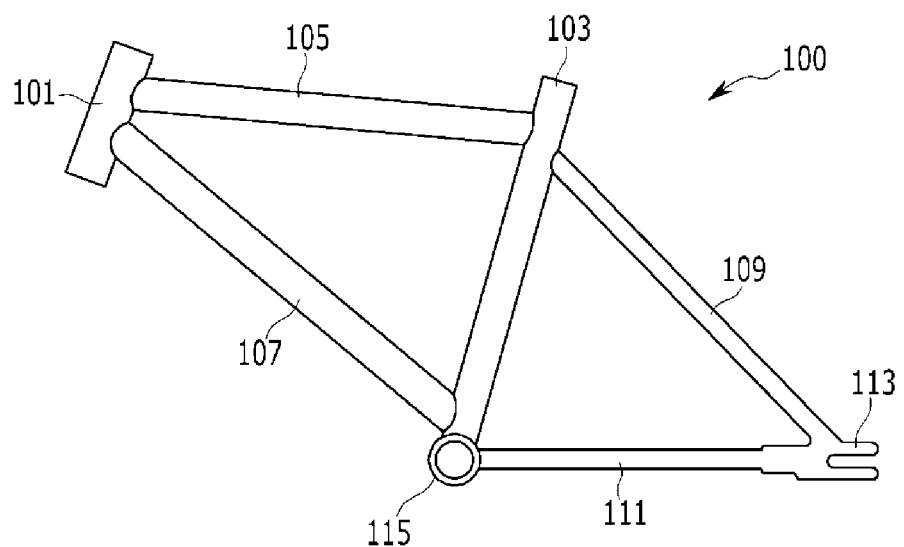
FIG. 1 is a configuration diagram of a frame unit for a bicycle according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

A part irrelevant to the description will be omitted to clearly describe the present invention, and the same or similar elements will be designated by the same reference numerals throughout the specification.

The size and thickness of each component illustrated in the drawings are arbitrarily shown for understanding and ease of description, but the present invention is not limited thereto. Thicknesses of several portions and regions are enlarged for clear expressions.

Further, in the following detailed description, names of constituents, which are in the same relationship, are divided into "the first", "the second", and the like, but the present invention is not limited to the order in the following description.

Throughout the specification and the claims, unless explicitly described to the contrary, the word "comprise" and variations such as "comprises" or "comprising" will be understood to imply the inclusion of stated elements but not the exclusion of any other elements.

In addition, "unit", "means", "part", "member", or the like, which is described in the specification, means a unit of a comprehensive configuration that performs at least one function or operation.

Figure 2:
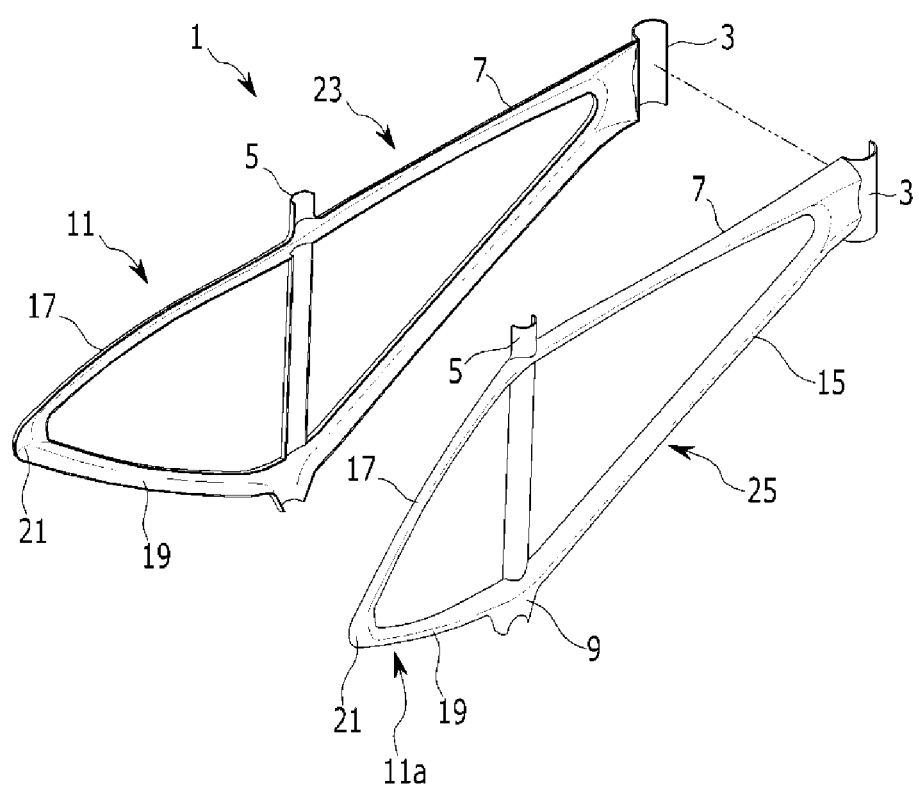
FIG. 2 is an exploded perspective view of a frame unit for a bicycle according to an exemplary embodiment of the present invention.
Figure 3:
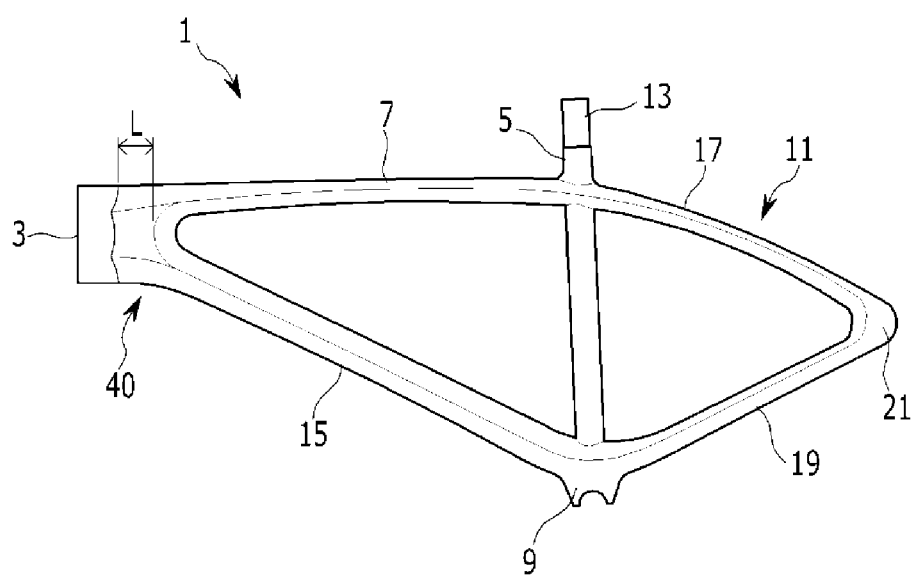
FIG. 3 is a side view of the frame unit for a bicycle according to the exemplary embodiment of the present invention.

FIG. 2 is an exploded perspective view of a frame unit for a bicycle according to the exemplary embodiment of the present invention, and FIG. 3 is a side view of the frame unit for a bicycle according to the exemplary embodiment of the present invention.

Referring to FIGS. 2 and 3, a frame unit 1 for a bicycle according to an exemplary embodiment of the present invention includes a head tube 3, a seat tube 5, a frame 7, a pedal assembly 9, and left and right stays 11 and 11a.

That is, a steering shaft to which a handle is mounted is installed to the head tube 3, and a front wheel is installed by a fork configured at a lower side of the steering shaft.

A seat is installed to the seat tube 5 by a seat pipe 13.

The frame 7 integrally connects the head tube 3 and the seat tube 5, and integrally connects the pedal assembly 9 with a lower extension frame 15, thereby forming a body of a bicycle.

Here, one frame may be formed between the head tube 3 and the seat tube 5.

The left and right stays 11 and 11a include an upper stay 17, and a lower stay 19, respectively, rear ends of the upper stay 17 and the lower stay 19 are connected to each other so as to form a rotating body fork 21 to which a rear wheel is mounted, and front ends of the upper stay 17 are connected to the seat tube 5, respectively.

Here, the front end of the lower stay 19 may be connected to the pedal assembly 9 that is configured at a lower side of the seat tube 5.

The pedal assembly 9 may be formed to protrude downward, and a pedal, which is connected to the rear wheel by a chain, is installed on the pedal assembly 9.

Here, the head tube 3, the seat tube 5, the frame 7, the pedal assembly 9, and the left and right stays 11 and 11a are formed by a left frame body 23 and a right frame body 25, which are integrally formed.

Further, the left and right frame bodies 23 and 25 are joined along edges thereof so as to form an overall configuration of the frame unit 1 for a bicycle.

The left and right frame bodies 23 and 25 are joined to each other by a welding method, and in this case, the welding method may be an arc welding method or the like.

Figure 4:
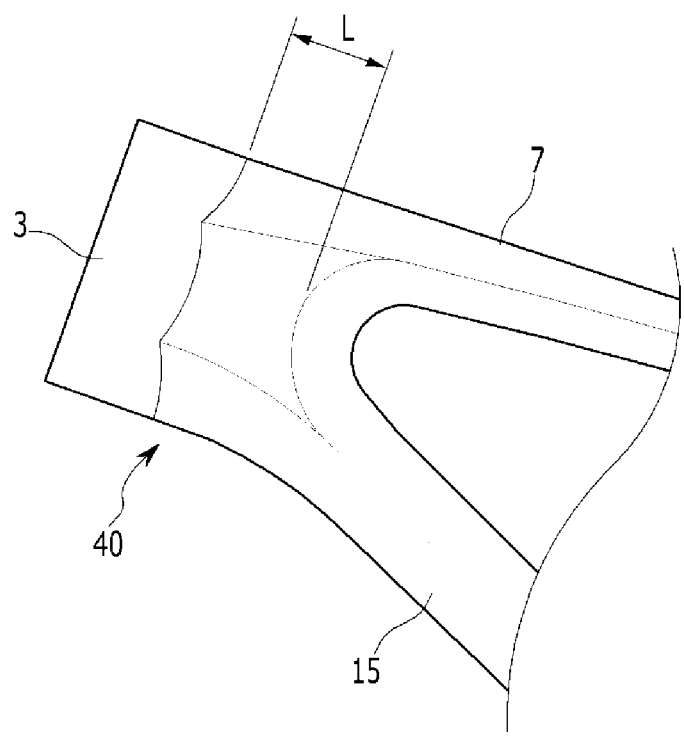
FIG. 4 is an enlarged view illustrating an adjusting portion of the frame unit for a bicycle according to the exemplary embodiment of the present invention.

FIG. 4 is an enlarged view illustrating an adjusting portion of the frame unit for a bicycle according to the exemplary embodiment of the present invention.

Referring to FIG. 4, an adjusting portion 40 for adjusting a position of the head tube 3 with respect to the frame 7 for each specification is integrally formed on an end of the frame 7.

Figure 5:
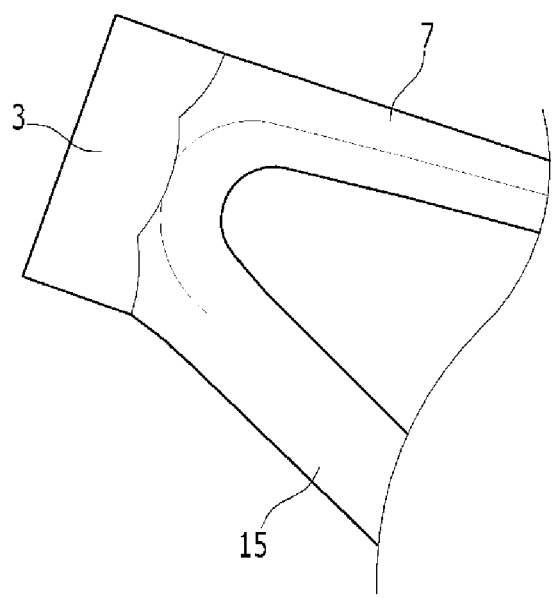
FIG. 5 is an enlarged view illustrating a state in which a length of the adjusting portion of the frame unit for a bicycle according to the exemplary embodiment of the present invention is adjusted.

FIG. 5 is an enlarged view illustrating a state in which a length of the adjusting portion of the frame unit for a bicycle according to the exemplary embodiment of the present invention is changed.

Referring to FIG. 5, the adjusting portion 40 is provided to cope with a size for each specification of the bicycle, and the head tube 3 is formed by processing the adjusting portion 40, or a part of the adjusting portion 40 is cut, and then the head tube 3 is coupled to the cut end.

That is, the adjusting portion 40 may be processed to have a pipe shape by bending the adjusting portion 40 so as to form the head tube 3, or the head tube 3 having a pipe shape may be coupled to the adjusting portion 40 after adjusting a length L of the adjusting portion 40.

Here, as the length of the adjusting portion 40 becomes shorter, an overall size of the frame unit 1 for a bicycle is decreased.

Further, when the adjusting portion 40 is shortened, an overall size of the bicycle is adjusted by applying the seat pipe 13 which is coupled to the seat tube 5 and has a relatively short length.

That is, the length of the seat pipe 13 is determined by changing a position of the head tube 3, and the overall size of the bicycle is adjusted to be small by using the seat pipe 13 having a relatively short length when the adjusting portion 40 is shortened, and using the seat pipe 13 having a relatively long length when the adjusting portion 40 is in a state as illustrated in FIG. 4. The overall size of the bicycle may be adjusted by coupling the seat pipe 13 having a predetermined length in accordance with a predetermined length L of the adjusting portion 40. In addition, the seat pipe 13 has a predetermined length, and an insertion depth of the seat pipe 13 may be adjusted.

As illustrated in FIG. 5, the overall size of the bicycle may be minimized by minimizing (entirely removing) the adjusting portion 40, and as illustrated in FIG. 4, the head tube 3 may be formed without adjusting the length of the adjusting portion 40. Further, it is possible to produce the bicycles having various sizes by variously adjusting the length of the adjusting portion 40.

Figure 6:
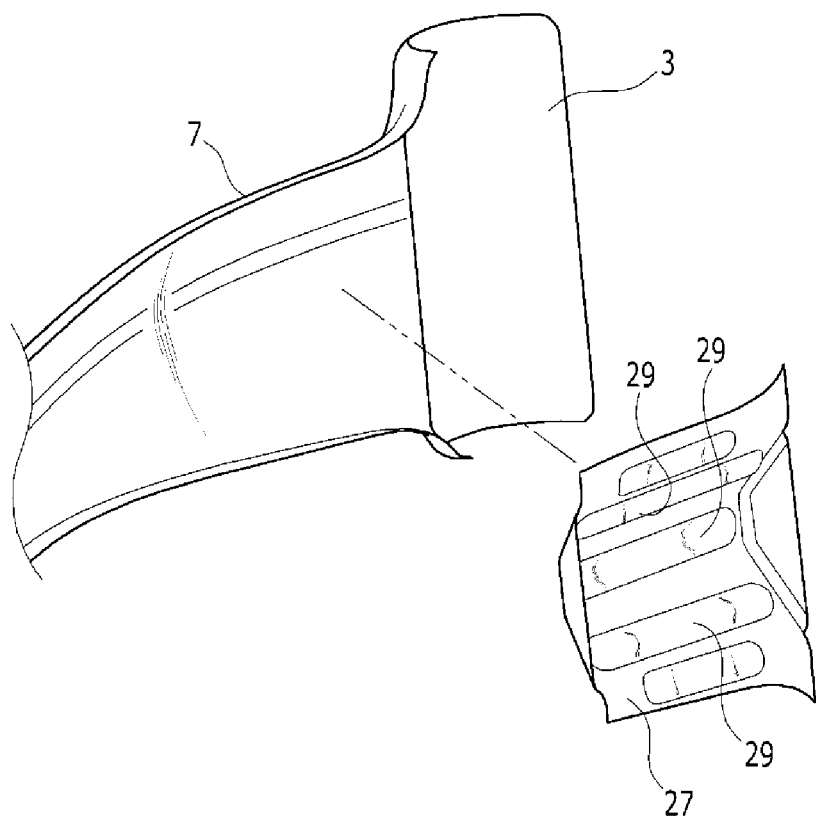
FIG. 6 is an enlarged perspective view illustrating a partial configuration in a state in which a reinforcing panel is installed on the frame unit for a bicycle according to the exemplary embodiment of the present invention.

FIG. 6 is an enlarged perspective view illustrating a partial configuration in a state in which a reinforcing panel is installed on the frame unit for a bicycle according to the exemplary embodiment of the present invention.

Referring to FIG. 6, the left and right frame bodies 23 and 25 are joined in a state in which a reinforcing panel 27 is locally installed inside the left and right frame bodies 23 and 25 such that an overall configuration of the frame 1 for a bicycle may be formed.

That is, the reinforcing panel 27 may be installed at a portion where rigidity is needed, that is, as illustrated in FIG. 6, between the head tube 3 and the frame 7, and the reinforcing panels 27 may also be installed between the seat tube 5 and the frame 7, on a portion of the rotating body fork 21 of the both stays 11 where the rear wheel is installed, and inside the pedal assembly 9, respectively.

Further, the reinforcing panels 27 are joined together when the left and right frame bodies 23 and 25 are joined to each other, in a state in which the reinforcing panels 27 are fitted to both inner sides of the left and right frame bodies 23 and 25, respectively, or in a state in which the reinforcing panels 27 are fitted into and then temporarily joined to the inner sides of the left and right frame bodies 23 and 25.

Here, grooves in which the reinforcing panels 27 are disposed may be formed at both the inner sides of the left and right frame bodies 23 and 25, and the reinforcing panels 27 may be fitted or temporarily joined to the grooves.

Meanwhile, the reinforcing panel 27 has a plurality of reinforcing beads 29 that is formed to protrude. The reinforcing beads 29 protrude so as to intersect inward and outward along an up and down direction of the reinforcing panel 27, thereby improving rigidity of the reinforcing panel 27 per se.

Figure 7:
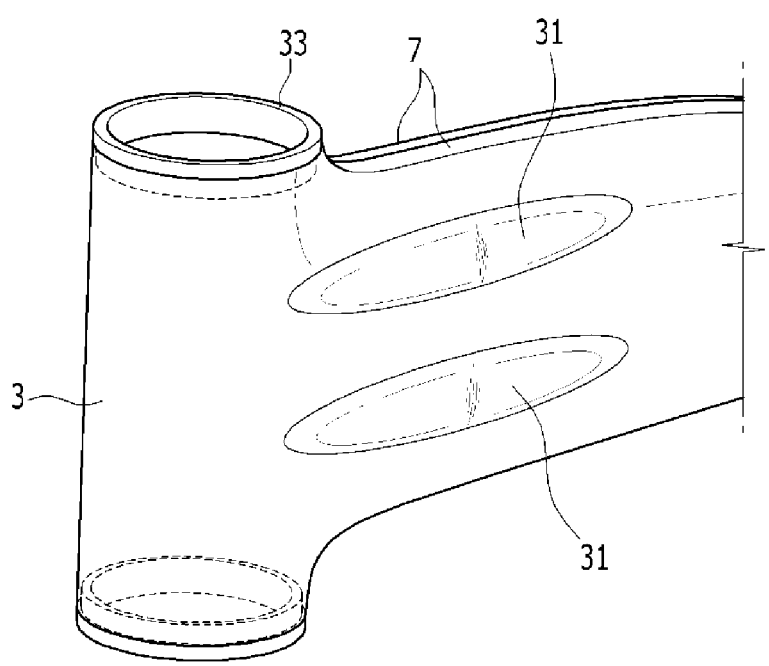
FIG. 7 is an enlarged perspective view illustrating a state in which rigid beads are formed on a frame portion adjacent to a head tube of the frame unit for a bicycle according to the exemplary embodiment of the present invention.

FIG. 7 is an enlarged perspective view illustrating a state in which rigid beads are formed on a frame portion adjacent to the head tube of the frame unit for a bicycle according to the exemplary embodiment of the present invention.

Referring to FIG. 7, rigid beads 31 are formed to protrude outward between the head tube 3 and the frame 7 of both the left and right frame bodies 23 and 25.

The plurality of rigid beads 31 is repeatedly formed on portions where the head tube 3 and the frame 7 are in contact with each other, along a longitudinal direction or an up and down direction of the frame 7, thereby improving rigidity at a connecting portion between the head tube 3 and the frame 7.

Here, repeated shapes protrude outward when the rigid beads 31 are formed on the frame 7, thereby improving an overall design of the frame unit 1 for a bicycle as well as improving rigidity of the frame 7.

While a configuration in which the rigid beads 31 are formed on the portions where the head tube 3 and the frame 7 are in contact with each other has been described above, the rigid beads 31 may also be formed on the adjusting portion 40.

A support ring 33 is inserted into the head tube 3 such that the steering shaft, which is not illustrated, may be installed to the support ring 33, and the support ring 33 may reinforce rigidity of the head tube 3.

According to the frame unit 1 for a bicycle according to the exemplary embodiment of the present invention, which has the aforementioned configuration, the head tube 3 is integrally formed with the main frame 7 without a joining portion such that residual stress due to welding heat at a joining portion in the related art may be removed, and a factor, which causes joint rigidity deterioration due to the residual stress, may be eliminated.

In addition, an occurrence of a safety accident due to cracks and damage which have occurred at the joining portion is reduced, and rigidity and durability between the head tube 3 and the frame 7 with respect to an impact load transmitted from a road surface and a fatigue load of the frame unit per se are firmly maintained.

Further, the left and right frame bodies 23 and 25, which form the frame unit 1 for a bicycle, are integrally formed, thereby making the entire outer appearance of the frame unit 1 for a bicycle be aesthetically attractive.

In addition, welding beads, which occur when the left and right frame bodies 23 and 25 are joined, are not directly exposed to a surface, such that an influence on the entire outer appearance design of the frame unit 1 for a bicycle is minimized.

In addition, welding work is performed along edges of the left and right frame bodies 23 and 25 when the left and right frame bodies 23 and 25 are joined, such that welding processes may be automated, working times may be reduced due to the automation, and welding quality and productivity may be improved.

In addition, since the length of the adjusting portion 40 formed between the head tube 3 and the frame 7 may be adjusted, bicycles having various sizes may be easily produced using a single mold, thereby reducing the number of molds manufactured for each specification (for each size).

Further, since the size for each specification may be addressed using a single mold, overall productivity is improved.

Hereinafter, a method of manufacturing the frame unit 1 for a bicycle according to the exemplary embodiment of the present invention, which has been described above, will be described with reference to FIGS. 2 to 7.

First, the adjusting portion 40, the seat tube 5, the frame 7, the pedal assembly 9, and the left and right stays 11 and 11a are integrally formed, and the left and right frame bodies 23 and 25, which are symmetric to each other, are press-formed, respectively.

In this case, the adjusting portion 40 for adjusting a position of the head tube 3 with respect to the frame 7 is integrally press-formed on one end of the frame 7.

When the left and right frame bodies 23 and 25 are press-formed, the plurality of rigid beads 31, which protrudes inward and outward as illustrated in FIG. 7, may also be formed on the adjusting portion 40 and the frame 7 along a longitudinal direction or an up and down direction of the frame 7.

Further, the length L of the adjusting portion 40 is adjusted for each size, and then the head tube 3 is formed.

The head tube 3 is processed to have a cylinder shape by bending the adjusting portion 40 having the adjusted length, or the head tube 3 having a cylinder shape is coupled to the adjusting portion 40.

Thereafter, the left and right frame bodies 23 and 25 formed by a press are joined to each other by welding along edges of the left and right frame bodies 23 and 25, and manufactured as the frame unit 1 for a bicycle, as illustrated in FIG. 3.

Meanwhile, as illustrated in FIG. 6, the reinforcing panels 27 are locally installed inside the left and right frame bodies 23 and 25 before the left and right frame bodies 23 and 25 are joined, and thereafter, the left and right frame bodies 23 and 25 may be joined along the edges of the left and right frame bodies 23 and 25.

The reinforcing panels 27 are installed at portions where rigidity is needed, that is, between the head tube 3 and the frame 7, between the seat tube 5 and the frame 7, on the portion of the rotating body fork of the both stays 11 where the rear wheel is installed, and inside the pedal assembly 9, respectively, and thereafter, the reinforcing panels 27 are joined together when the left and right frame bodies 23 and 25 are joined.

In this case, the reinforcing panels 27 may be joined together with the left and right frame bodies 23 and 25 in a state in which the reinforcing panels 27 are fitted or temporarily joined to the left and right frame bodies 23 and 25, and the plurality of reinforcing beads 29, which protrudes so as to intersect each other inward and outward, may also be formed.

In addition, the support ring 33 is inserted into the head tube 3 such that the steering shaft, which is not illustrated, may be installed to the support ring 33, and the support ring 33 may reinforce rigidity of the head tube 3.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A frame unit for a bicycle comprising:
   a left frame body in which a part of an adjusting portion, a part of a seat tube, a part of a frame, and a left stay are integrally formed; and a right frame body in which a part of the adjusting portion, a part of the seat tube, a part of the frame, and a right stay are integrally formed, wherein the seat tube and the frame are integrally formed by adjusting a length of the adjusting portion, and then the left frame body and the right frame body are coupled integrally, and wherein the left and right frame bodies are joined to each other along edges of the left and right frame bodies in a state in which a reinforcing panel is installed inside the left and right frame bodies, wherein the reinforcing panel is installed between the head tube and the frame.

2. The frame of claim 1, wherein before the left frame body and the right frame body are coupled, the length of the adjusting portion is adjusted, and a head tube is formed by bending an end portion of the adjusting portion.

3. The frame of claim 2, wherein a support ring is inserted onto the head tube.

4. The frame of claim 1, wherein the reinforcing panel comprises a plurality of reinforcing panels that are joined together with one another when the left and right frame bodies are joined and wherein each one of the respective reinforcing panels are fitted or temporarily joined to one of the left or right frame bodies prior to the left and right frame bodies being joined to one another.

5. The frame of claim 1, wherein a seat pipe is coupled to the seat tube, and a length of the seat pipe is determined in accordance with a predetermined position of the head tube.

6. The frame of claim 1, wherein before the left frame body and the right frame body are coupled, the length of the adjusting portion is adjusted, and a head tube is coupled to the adjusting portion.

7. The frame of claim 6, wherein a seat pipe is coupled to the seat tube, and a length of the seat pipe is determined in accordance with a predetermined position of the head tube.

8. A frame unit for a bicycle comprising:
a left frame body in which a part of an adjusting portion, a part of a seat tube, a part of a frame, and a left stay are integrally formed; and
a right frame body in which a part of the adjusting portion, a part of the seat tube, a part of the frame, and a right stay are integrally formed,
wherein the seat tube and the frame are integrally formed by adjusting a length of the adjusting portion, and then the left frame body and the right frame body are coupled integrally,
wherein the left and right frame bodies are joined to each other along edges of the left and right frame bodies in a state in which a reinforcing panel is installed inside the left and right frame bodies,
wherein on the reinforcing panel, a plurality of reinforcing beads are formed, and
wherein the reinforcing beads are spaced apart, and wherein at least one of the plurality of reinforcing beads protrudes inward from the reinforcing panel and another of the at least one of the plurality of reinforcing beads protrudes outward from the reinforcing panel.

9. A method of manufacturing a frame unit for a bicycle comprising:
press-forming a left frame body in which a part of an adjusting portion, a part of a seat tube, a part of a frame, and a left stay are integrally formed;
press-forming a right frame body in which a part of the adjusting portion, a part of the seat tube, a part of the frame, and a right stay are integrally formed;
adjusting a length of the adjusting portion; and
coupling the left frame body and the right frame body,
wherein a reinforcing panel is installed inside the left and right frame bodies, and the reinforcing panel is joined together with the left and right frame bodies along edges thereof, and
wherein the reinforcing panel is installed between the head tube and the frame, and thereafter, joined together with the left and right frame bodies.

10. The method of claim 9, wherein after adjusting the length of the adjusting portion, a head tube is formed by bending a portion of the adjusting portion, and then the left frame body and the right frame body are coupled.

11. The method of claim 10, wherein a support ring is inserted onto and coupled to the head tube.

12. The method of claim 9, wherein the press-forming further forms a plurality of reinforcing beads on the adjusting portion.

13. The method of claim 9, wherein the reinforcing panel comprises a plurality of reinforcing panels that are joined together with one another when the left and right frame bodies are joined and wherein each one of the respective reinforcing panels are fitted or temporarily joined to one of the left or right frame bodies prior to the left and right frame bodies being joined to one another.

14. The method of claim 9, wherein after adjusting the length of the adjusting portion, the left frame body and the right frame body are coupled, and a head tube is coupled to the adjusting portion.

15. A method of manufacturing a frame unit for a bicycle comprising:
press-forming a left frame body in which a part of an adjusting portion, a part of a seat tube, a part of a frame, and a left stay are integrally formed;
press-forming a right frame body in which a part of the adjusting portion, a part of the seat tube, a part of the frame, and a right stay are integrally formed;
adjusting a length of the adjusting portion; and
coupling the left frame body and the right frame body,
wherein a reinforcing panel is installed inside the left and right frame bodies, and the reinforcing panel is joined to the left and right frame bodies along edges thereof, and
wherein on the reinforcing panel, a plurality of reinforcing beads are formed, and wherein the reinforcing beads are spaced apart, and wherein at least one of the plurality of reinforcing beads protrudes inward from the reinforcing panel and another of the at least one of the plurality of reinforcing beads protrudes outward from the reinforcing panel.

* * * * *